US007043053B1

(12) United States Patent
Patton et al.

(10) Patent No.: US 7,043,053 B1
(45) Date of Patent: May 9, 2006

(54) MATCHING IMAGE CHARACTERISTICS OF STAMPS AND PERSONAL IMAGES TO AESTHETICALLY FIT INTO A PERSONAL POSTAL PRODUCT

(75) Inventors: David L. Patton, Webster, NY (US); Frank Pincelli, Rochester, NY (US); H. Mark Delman, Fairport, NY (US); James R. Forger, Jr., Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 767 days.

(21) Appl. No.: 09/669,177

(22) Filed: Sep. 25, 2000

Related U.S. Application Data

(63) Continuation-in-part of application No. 09/640,435, filed on Aug. 17, 2000, now abandoned.

(51) Int. Cl.
*G06K 9/00* (2006.01)

(52) U.S. Cl. .......................................... 382/101; 283/71

(58) Field of Classification Search ................ 382/100, 382/101, 102; 705/10, 35, 60, 410, 401, 705/402, 408, 411; 299/99.8, 300; 106/31.17; 235/454, 380, 381; 380/51; 283/51, 67, 283/70, 71, 74, 75, 77, 78; 229/301, 302, 229/305, 306, 92, 921; 355/40; 40/638
See application file for complete search history.

(56) References Cited

U.S. PATENT DOCUMENTS

| | | | | |
|---|---|---|---|---|
| 4,201,617 | A * | 5/1980 | Orsinger et al. | 156/351 |
| 4,872,706 | A | 10/1989 | Brewen et al. | |
| 5,423,573 | A | 6/1995 | de Passille | |
| 5,454,600 | A | 10/1995 | Floyd | |
| 5,717,597 | A * | 2/1998 | Kara | 705/408 |
| 5,801,944 | A | 9/1998 | Kara | |
| 5,819,240 | A | 10/1998 | Kara | |
| 5,852,813 | A * | 12/1998 | Guenther et al. | 705/408 |
| 5,873,605 | A * | 2/1999 | Kaplan | 283/71 |
| 5,923,406 | A | 7/1999 | Brasington et al. | |
| 6,035,059 | A * | 3/2000 | Kurosawa et al. | 382/164 |
| 6,203,067 | B1 * | 3/2001 | Shipston et al. | 283/71 |
| 6,499,654 | B1 * | 12/2002 | Huff et al. | 229/92.8 |
| 6,503,329 | B1 * | 1/2003 | Patton et al. | 118/669 |

* cited by examiner

*Primary Examiner*—Kanjibhai Patel
*Assistant Examiner*—Abolfazl Tabatabai
(74) *Attorney, Agent, or Firm*—Frank Pincelli

(57) ABSTRACT

A postal assembly and method of making the assembly. The assembly includes an official postal product have a designated area which is modified so as to provide a desired visual affect with an personal image that is to be placed in said designated area.

6 Claims, 10 Drawing Sheets

MATCHING IMAGE CHARACTERISTICS OF STAMPS AND PERSONAL IMAGES TO AESTHETICALLY FIT INTO A PERSONAL POSTAL PRODUCT

FIELD OF THE INVENTION

This is a continuation-in-part of application Ser. No. 09/640,435, filed Aug. 17, 2000 now abandoned, entitled MATCHING IMAGE CHARACTERISTICS OF STAMPS AND PERSONAL IMAGES TO AESTHETICALLY FIT INTO A PERSONAL POSTAL PRODUCT, by David L. Patton et al.

This invention relates to an article and system used for creating and printing of customized personal image with an area designated for affixing a postal product. The area bounded by border created using an image characteristic of the personal image and the postal product image to have the postal product aesthetically blend with the personal image.

BACKGROUND OF THE INVENTION

In 1982, a Texas firm called American Discount Stamps proposed to combine postage stamps with advertising matter. A gummed stamp was affixed to a 2-inch by 3-inch label bearing a printed advertisement that had adhesive on the back. Users would affix the entire label containing the affixed stamp to an envelope or parcel. Ken Lawrence discusses this in his book, *Linn 's Plate Number Coll Handbook*. The system is disclosed U.S. Pat. No. 4,872,706.

A very similar postal product is disclosed in U.S. Pat. No. 5,423,573 were a personal image is printed as a separate sticker and adhered directly to an official stamp in a designated area. As described in articles in the hobby press the U.S. Pat. No. 5,423,573 patent is almost identical to a scheme from the 19$^{th}$ century. From 1876 to 1886, the U.S. Post Office Department permitted so-called advertising collars to be printed around the embossed stamps on stamped envelopes as discussed in.

U.S. Pat. No. 5,873,605 discloses creating a postage stamp using an electronic camera to capture an image of oneself via a vending machine. Likewise U.S. Pat. No. 5,923,406 discloses producing a postage stamp using an electronic camera and a vending machine. In both cases a personal image is captured by an electronic camera in a kiosk and printed in a designated area on and official postal product.

There are several problems that are not addressed using these methods. The first problem is no attempt is made to designate an area where an official postal product may be placed which has been modified based on an image characteristic of the official postal product. The second is no attempt is made to designate an area where an official postal product may be placed which has been modified based on an image characteristic of the associated personal image. Another problem is the placement of the official postal product in the exact area designated. If the official postal product is not positioned accurately, the aesthetics may be degraded. Yet another problem is if the image characteristic chosen for example color is not properly matched, the mismatch will detrimentally affect the appearance of the personal postal product.

The present invention provides a method and system for making a postal product assembly by obtaining a personal image and determining at least one characteristic the image. Obtaining an official postal product (stamp) having at least one characteristic and modifying at least one characteristic of the personal image in response to at least one know characteristic of the postal product.

SUMMARY OF THE INVENTION

In accordance with one aspect of the present invention there is provided a postal assembly wherein a first planner support structure having a top surface and a bottom surface. The top surface having a personal image and the bottom surface having an adhesive layer. The personal image having a designated area where an official postal product may be placed which has been modified based on one or more image characteristics of the personal image and the stamp.

In another aspect of the present invention there is provided a method of making a personal postal product comprises obtaining a both a personal image and an official postal product such as a stamp, determining at least one characteristic of both the personal image and the stamp image. Modifying the personal image in relationship to that characteristic to create an aesthetically pleasing designated area on the personal image for the stamp.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The file of this patent contains at least one drawing executed in color. Copies of the patent with color drawings will be provided by the Patent and Trademark Office upon request and payment of the necessary fee. The colors in the color drawings have been modified to highlight certain effects.

In the detailed description of the preferred embodiments of the invention presented below, reference is made to the accompanying drawings in which.

DETAILED DESCRIPTION OF THE INVENTION

Figure 1:
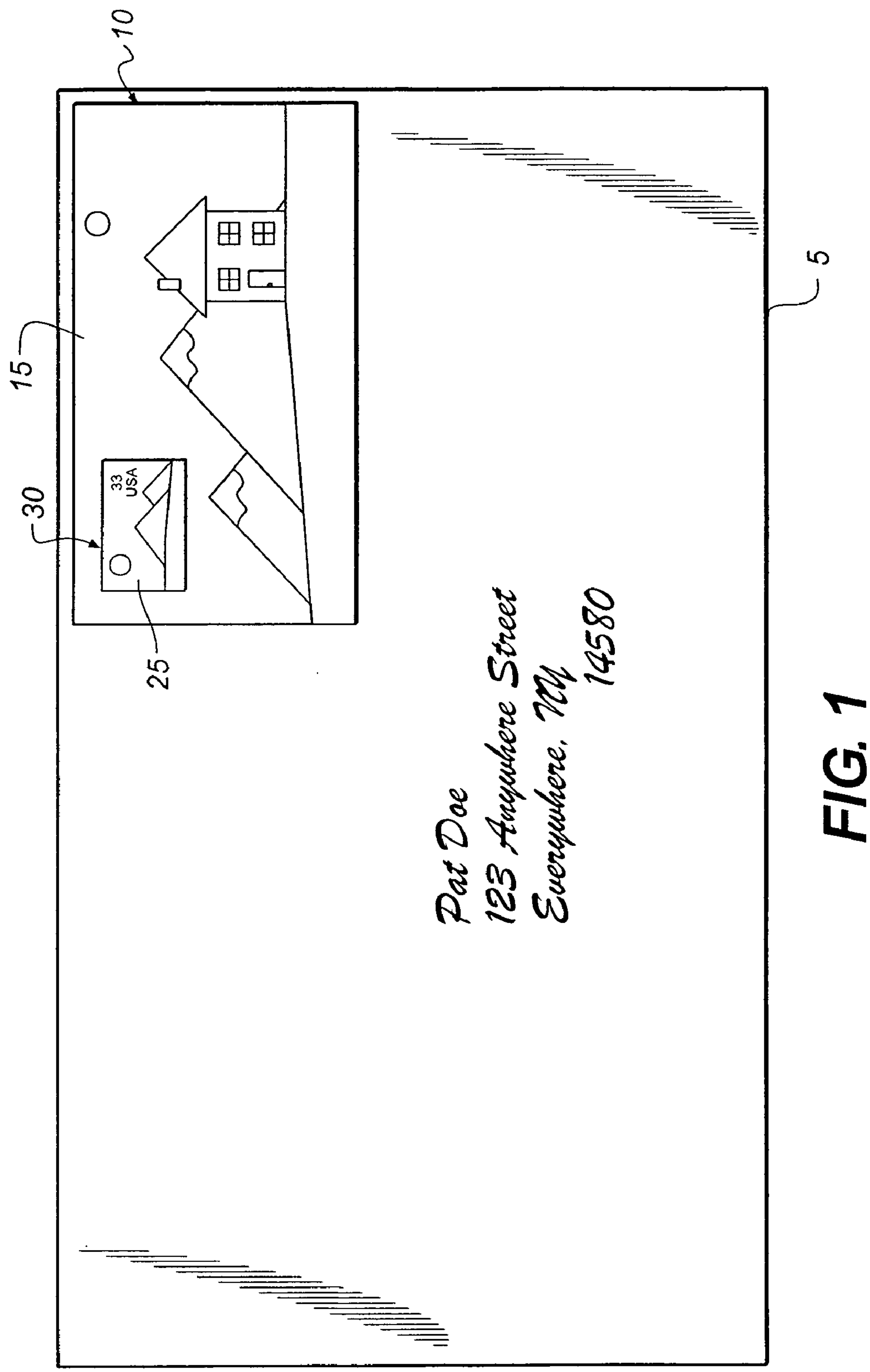
FIG. 1 is a plan view of an envelope affixed with a personal image and an official postal image made in accordance with the present invention.

Referring now to FIG. 1, FIG. 1 is a plan view of an envelope 5 affixed with a personal postal product 10 containing a personal image 15 or in the case of a business an advertisement or logo. The personal image 15 is printed on the top surface 55 (as shown in FIG. 4) of a label 20 with an adhesive 65 on the bottom surface 60 so the label can be affixed to the envelope 5. The postal product 10 having an official postal product 30 consisting of an official postal image 25 printed in accordance to the specifications given in USPS-P-1238D, Jun. 27, 1997. The official postal product 30, such as a stamp, typically having an adhesive layered on the under side, so it can be affixed to the top surface of the first label 20.

Figure 2:
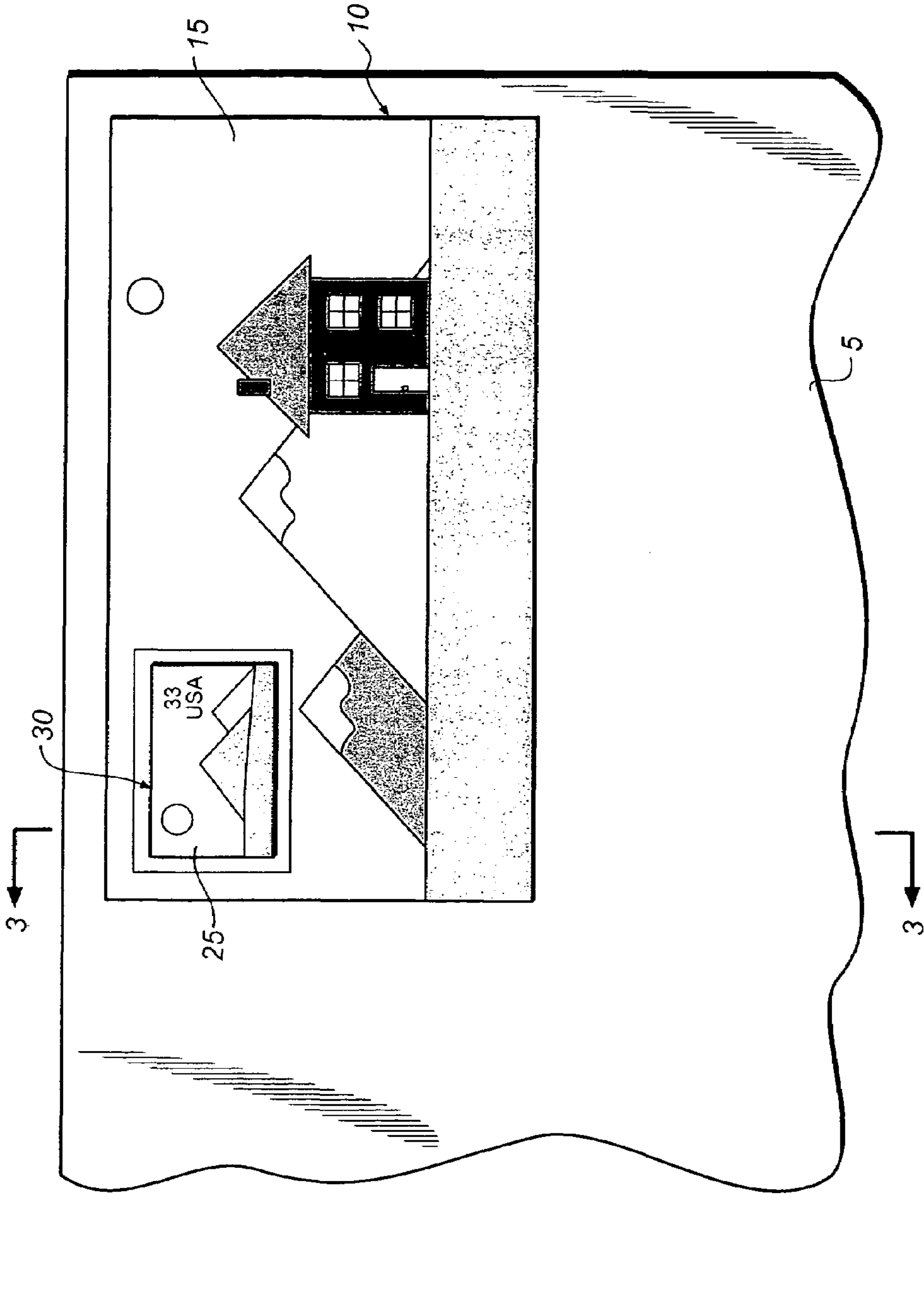
FIG. 2 is an enlarged partial view (in color) of the envelope of FIG. 1.

Now referring to FIG. 2, there is illustrated an enlarged partial color view of an envelope 5 affixed with the personal postal product 10. As previously discussed in FIG. 1 like numerals indicating like parts and operations.

Figure 3:
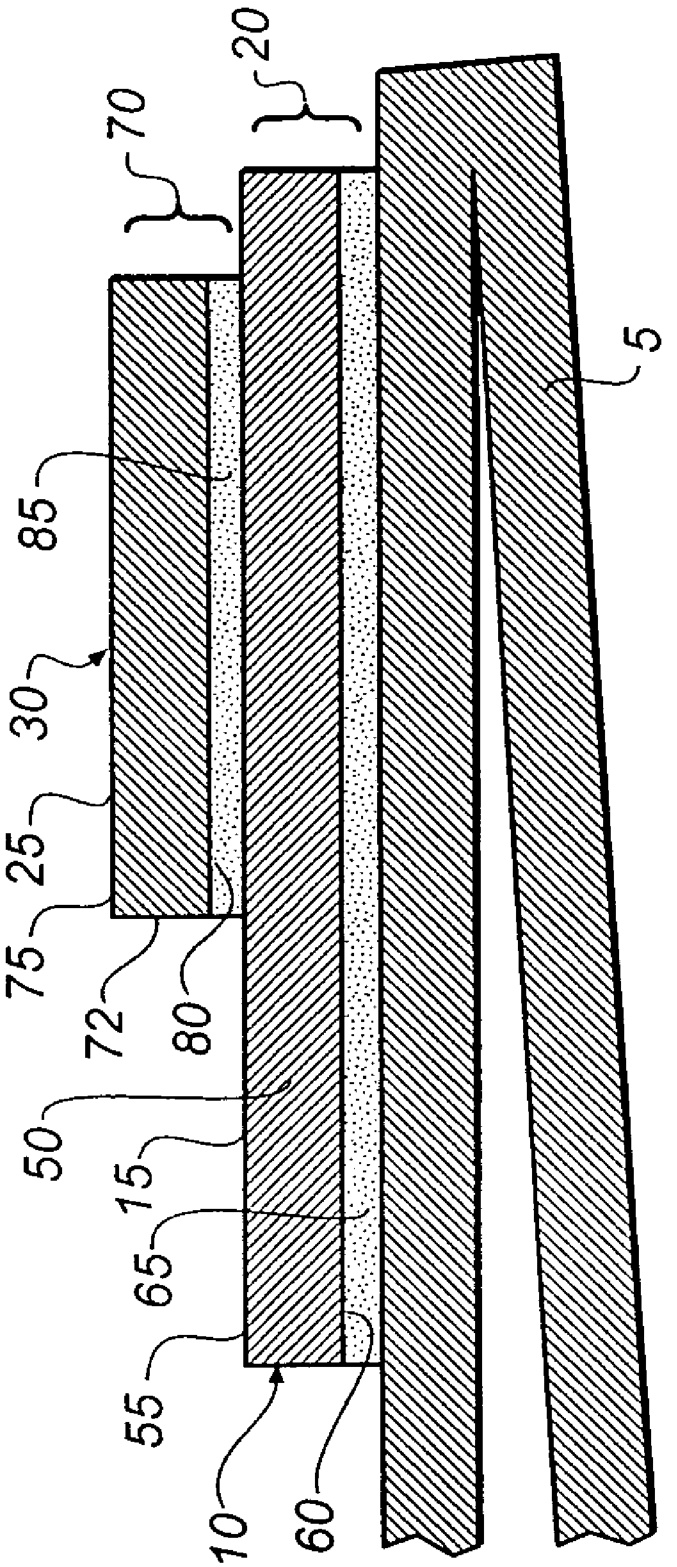
FIG. 3 is cross-sections view 3—3 of FIG. 2.

Referring now to FIG. 3, there is illustrated across-sections view taken along line 3—3 of FIG. 2. The personal postal product 10 comprises label 20 having a first planner support structure 50 having a top surface 55 and a bottom surface 60. The top surface 55 having a personal image 15. The first planner support structure 50 also having a bottom surface 60, having an adhesive layer 65. The stamp 30 comprises a first planner support structure 72 having a top surface 75 and a bottom surface 80, the top surface 75 having the official postal image 25 as previously discussed. The bottom surface 80 is adhesively affixed to support structure 50. In the embodiment illustrated an adhesive layer 85 is provided on the stamp 30. However, the present invention is not so limited. Adhesive may be manually applied to the stamp 30. Alternatively an adhesive layer maybe provided on the label's top surface 55 to secure the stamp 30 thereto.

Figure 4A:
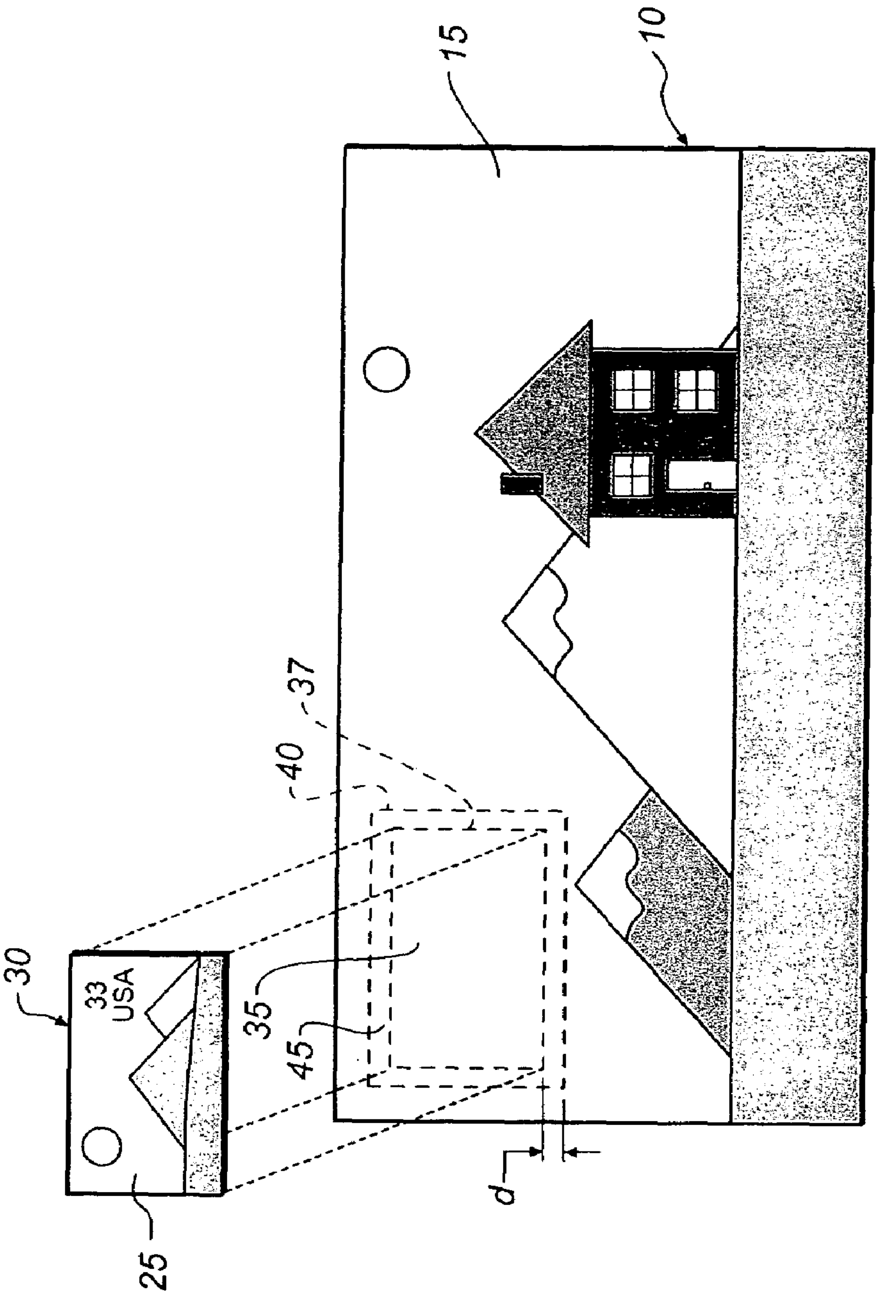
FIG. 4*a* is an enlarged view (in color) of the personal image and an official postal image illustrated in FIGS. 1 and 2.

Now referring to FIG. 4*a*, there is illustrated an enlarged color view of the personal postal product 10 illustrating the location of the placement of the stamp 30 thereon. The personal image 15 on the personal postal product 10 having a designated area 35 illustrated by the outer dashed line 40 based on one or more of the characteristics of both the personal image 15 and the official postal image 25 on the stamp 30. In the embodiment shown in FIG. 4*a*, the designated area 35 has a border area 45 which is defined by the line 40 and the line 37 which is spaced a distance "d" internally of area 35. Border area 45 is provided with a feathering affect so that the official postal image 25 blends aesthetically with the personal image 15, when the stamp 30 is placed on the label 20 (shown in FIG. 3) having the personal image 15. The distance "d" is selected such that the stamp 30 may be placed in the designated area 35 minimizing the possibility of having a non-uniform appearance due to misplacement of the stamp 30 in the designated area 35.

Figure 4B:
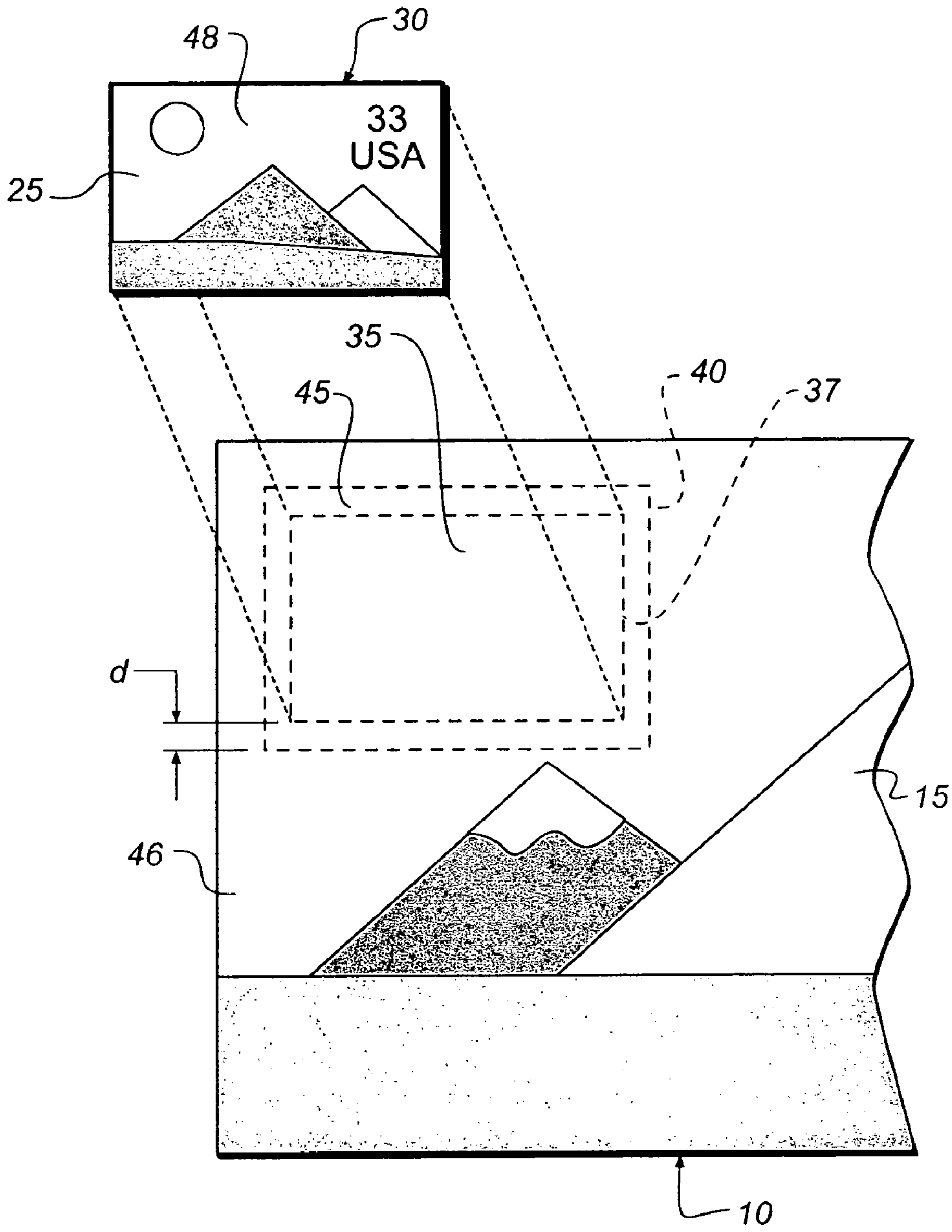
FIG. 4*b* is an enlarged partial view (in color) of the personal postal product having a personal image of FIG. 4*a* illustrating a designated area.

Referring to FIG. 4*b*, there is illustrated an enlarged partial color view of the personal postal product 10 having the personal image 15 shown in FIG. 4*a*. In the embodiment illustrated the color of the border area 45 of the designated area 35 is matched to one of the colors present in personal image 15 and in the stamp image area 25. For example the color in the sky 46 of the personal image 15 matches the color of the sky 48 of the stamp image area 25. The color used to print the border area 45 the designated area 35 may be a complimentary hue or shade of one the colors present in the personal image area 15 and the stamp image area 25. The color for the border area 45 the designated area 35 can be automatically determined by digitally scanning the personal image 15. Using an algorithm to identify an appropriate color for the border area 45 from the colors present in the personal image area 15 and the stamp image area 25. This is accomplished by determining the colorimetric values of the image pixels of the digital file of the personal image area 15 and the stamp image area 25 using standard colorimetric techniques.

Colorimetry is the measurement of color. A set of colorimetric parameters for an object, based on measured colorimetric parameters, can quantify the color of the object as it appears to the average observer under a specific set of viewing conditions. Techniques described in U.S. Pat. No. 5,528,339 can be used to identify the colorimetric values of the image suitable for use with the present invention. The method previously described also allows the border area 45 to gradually transform from a color in the stamp 30 to a color in the personal image 15.

Figure 4C:
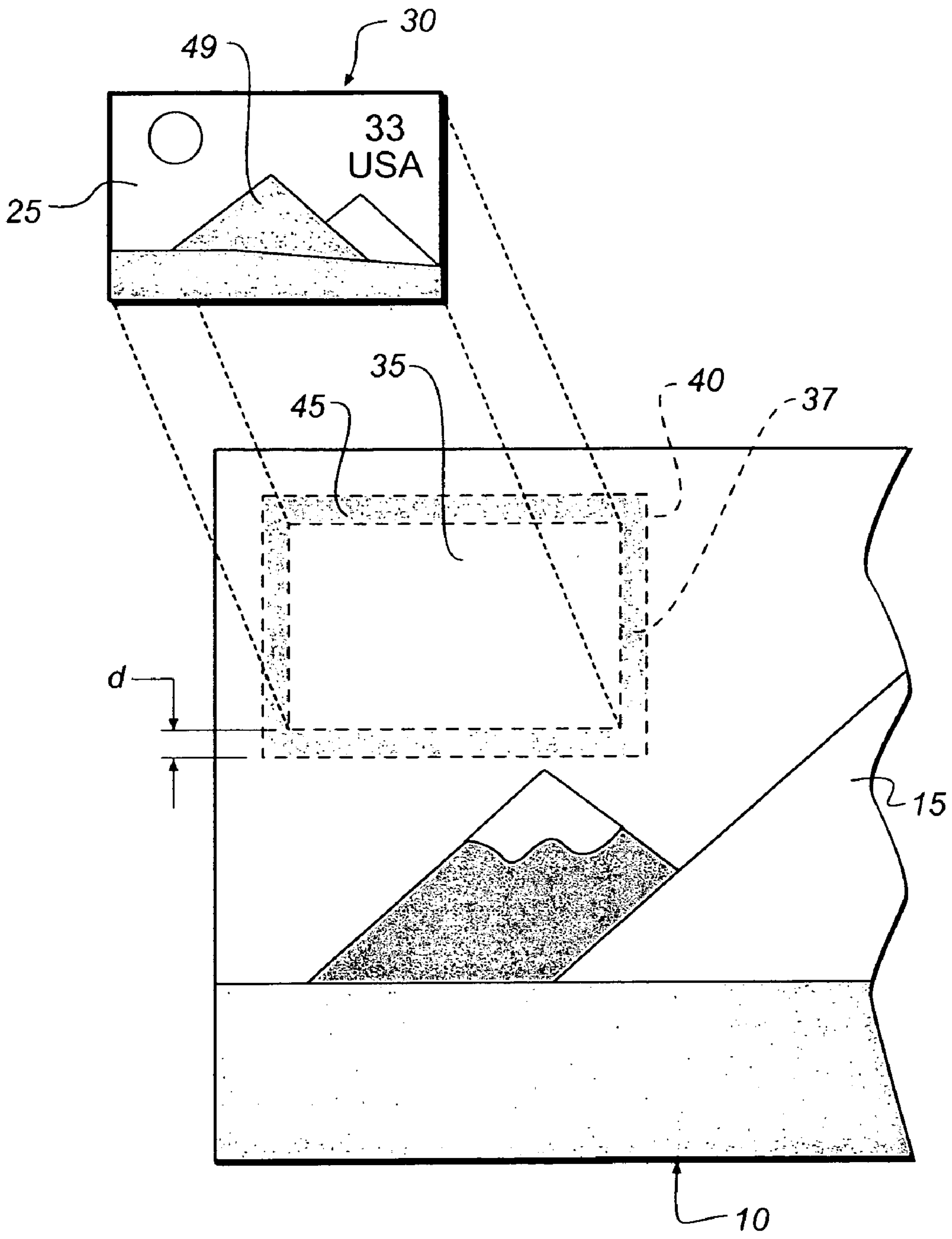
FIG. 4*c* is a view (in color) similar to FIG. 4*b* illustrating a modified personal image.

As well as being complimentary, alternatively the color of the border area 45 of the designated area 35 may be a contrasting color. Referring to FIG. 4*c*, there is illustrated an enlarged partial color view of a modified personal postal product 10 having the personal image 15 shown in FIG. 4*a*. As previously discussed in FIG. 4*a* like numerals indicating like parts and operations. In the embodiment illustrated the color of the border area 45 is contrasted to one of the colors present in personal image 15. For example the color in the sky 46 of the personal image 15 contrasts with the color of the mountain 49 of the stamp image area 25. As in the case of the matching or complimentary color, the contrasting color for the border area 45 is determined using the colorimetric values of the image pixels of the digital file of the personal image area 15 and the stamp image area 25 using standard calorimetric techniques.

Figure 4D:
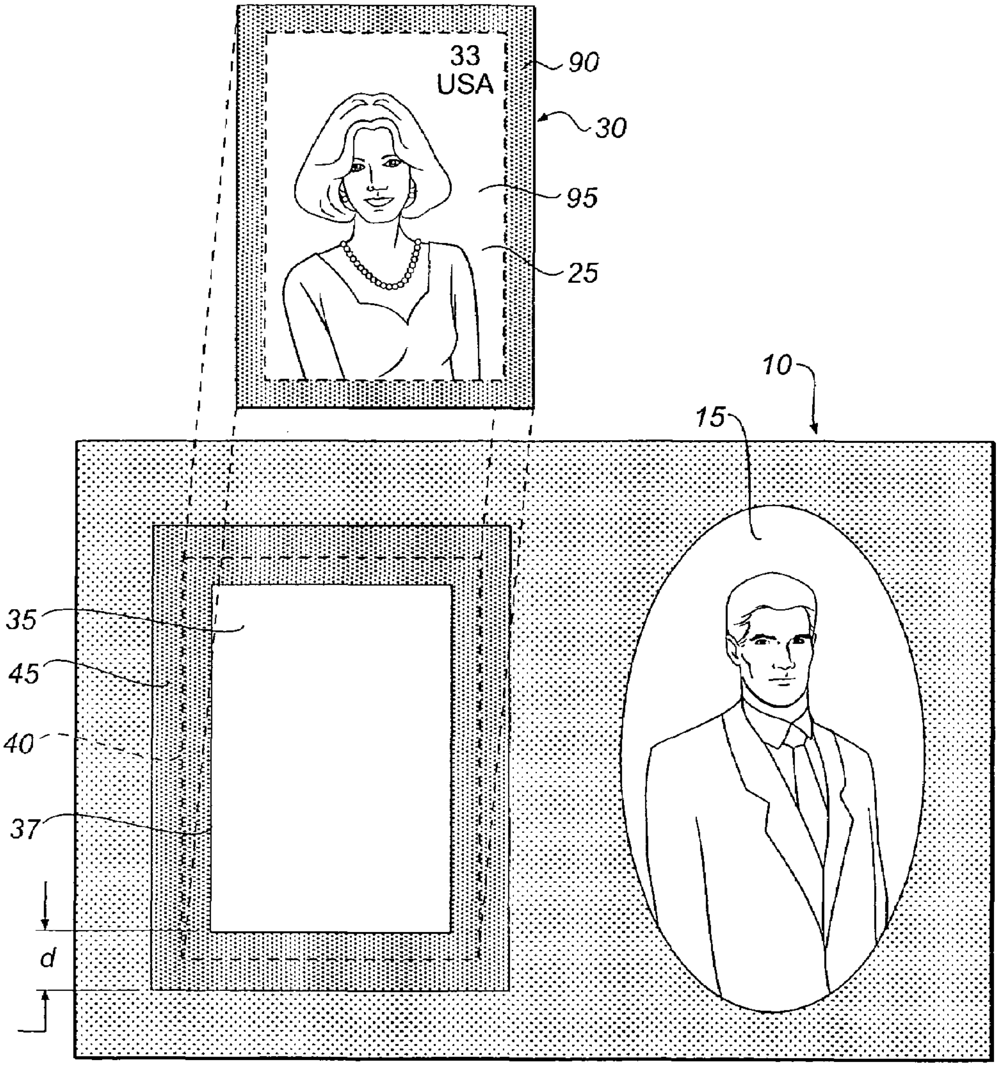
FIG. 4*d* is an enlarged view of a modified personal postal product made in accordance with the present invention having a personal image.

Referring now to FIG. 4*d*, there is illustrated an enlarged view of yet another modified personal postal product 10 having a personal image 15 and a designated area 35 for the placement of a stamp 30. As previously discussed in FIG. 4*a* like numerals indicating like parts and operations. In the embodiment illustrated the pattern of the border area 45 of the designated area 35 is matched to the pattern 90 surrounding the image 95 in the image area 25 of the stamp 30.

Figure 4E:
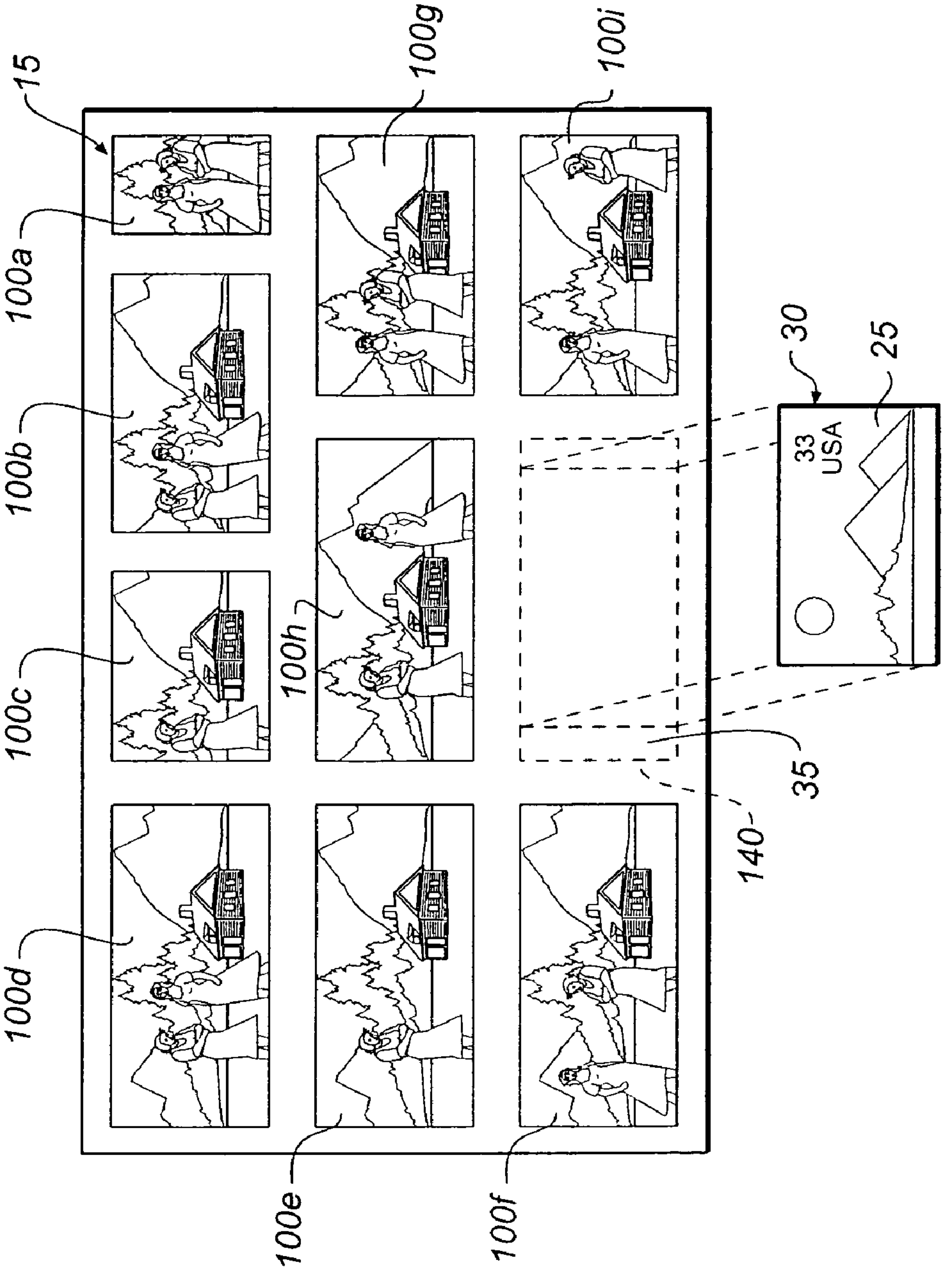
FIG. 4*e* is an enlarged view of yet another modified the personal postal product made in accordance with the present invention.

Referring now to FIG. 4*e*, there is illustrated an enlarged view of still another modified personal postal product 10 having a personal image 15 and a designated area 35 for the placement of a stamp 30. As previously discussed in FIG. 4*a* like numerals indicating like parts and operations. In this embodiment the image area 15 of the personal postal product 10 is comprised of a plurality of imagettes 100 *a, b, c, d, e, f, g, h*, and *i*. The dashed line 140 defines the designated area 35. The imagettes 100 *a . . . i* are configured such that they match the relative size of the stamp 30. The designated around 35 is configured in size and location such that when the stamp 30 is affixed to the top surface 55 of the personal postal product 10 the stamp 30 matches the imagettes 100 *a–i*. In another aspect of this embodiment some element of the subject matter of the image 25 of the stamp 30 can be chosen to match some element of the subject matter of the imagettes 100 *a–i*.

Figure 4F:
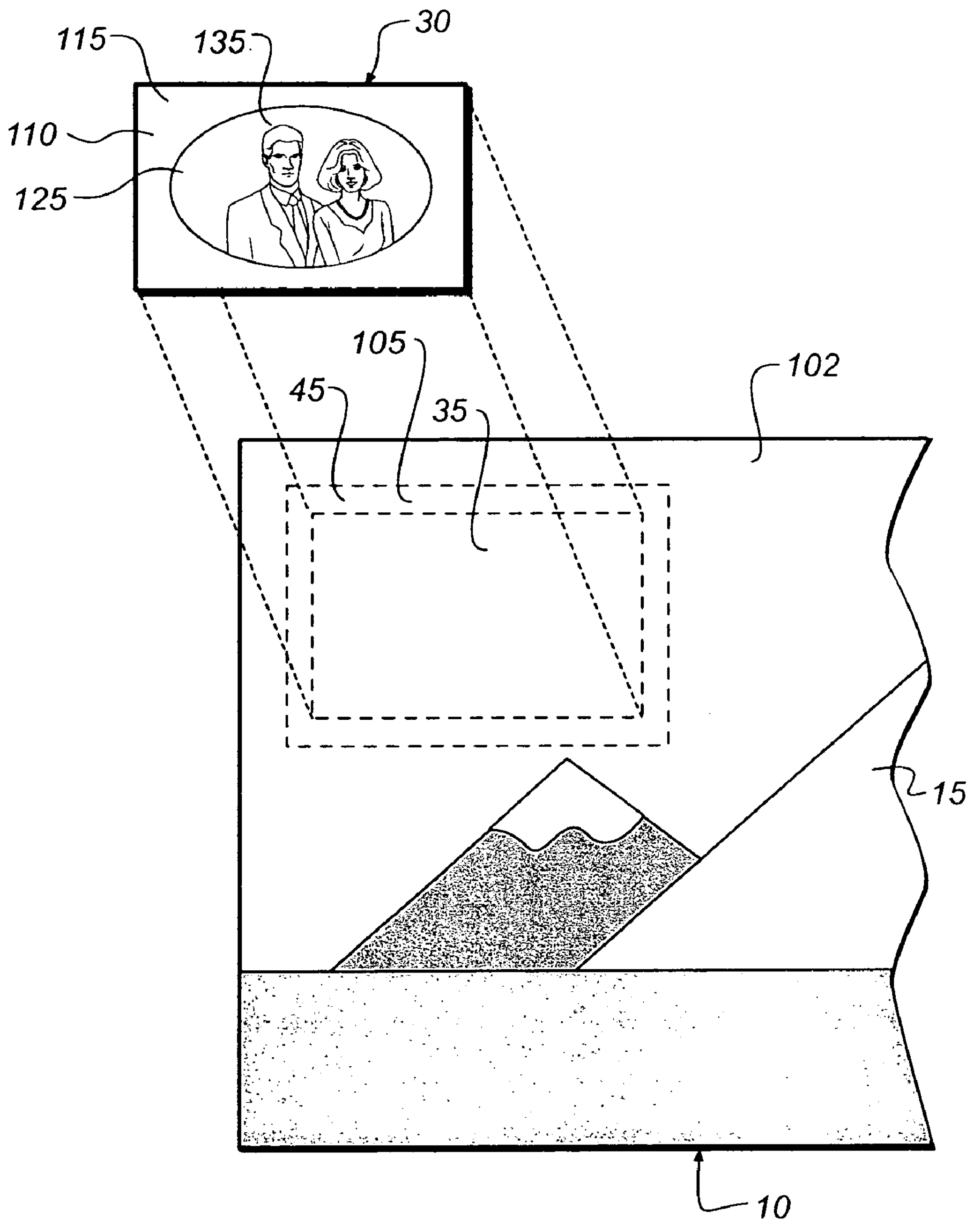
FIG. 4*f* is an enlarged partial view (in color) of a modified personal postal product having a personal image of FIG. 4*a* illustrating a designated area.

Referring to FIG. 4*f*, there is illustrated an enlarged partial color view of a modified personal postal product 10 having the personal image 15 shown in FIG. 4*a*. Both the color 102 and pattern 105 of the border area 45 of the designated area 35 is matched to one of the colors 115 and the pattern 110 surrounding the official postal image 135 in the image area 125 of the stamp 30.

Figure 5A:
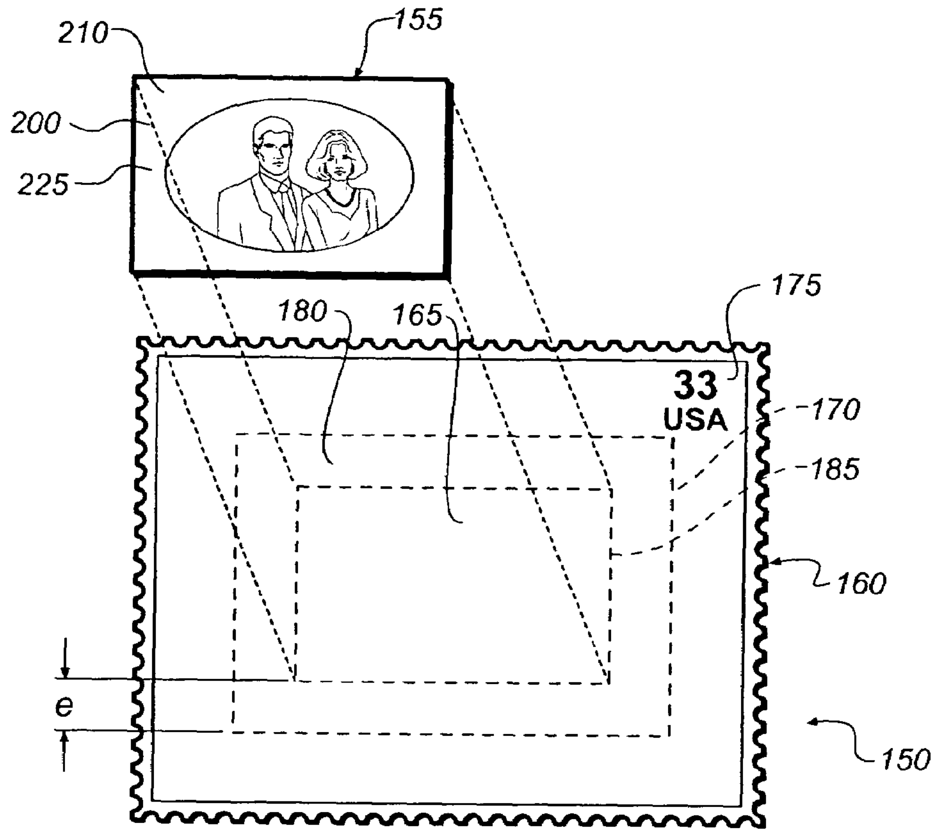
FIG. 5*a* is an enlarged view (in color) of a still another modified personal postal product having a personal image made in accordance with the present invention.

Now referring to FIG. 5*a*, there is illustrated an enlarged color view of the personal postal product 150 illustrating the location of the placement of a personal image 155 onto a stamp 160. The stamp 160 having a designated area 165 illustrated by the outer dashed line 170 based on one or more of the characteristics of both the personal image 155 and the official postal image 175 on the stamp 160. In the embodiment shown in FIG. 5*a*, the designated area 165 has a border area 180 which is defined by the dashed line 170 and the dashed line 185 which is positioned internally of area 180 a distance "e" from line 170. Border area 180 is provided with a feathering affect so that the personal image 155 blends aesthetically with the postal image 175, when the personal image 155 is placed on the stamp 160. The feathered effect may comprise, but not limited to, color, texture, pattern etc. The distance "e" is selected such that the personal image 155 may be placed in the designated area 165 minimizing the possibility of having a non-uniform appearance due to misplacement of the personal image 155 in the designated area 165.

Figure 5B:
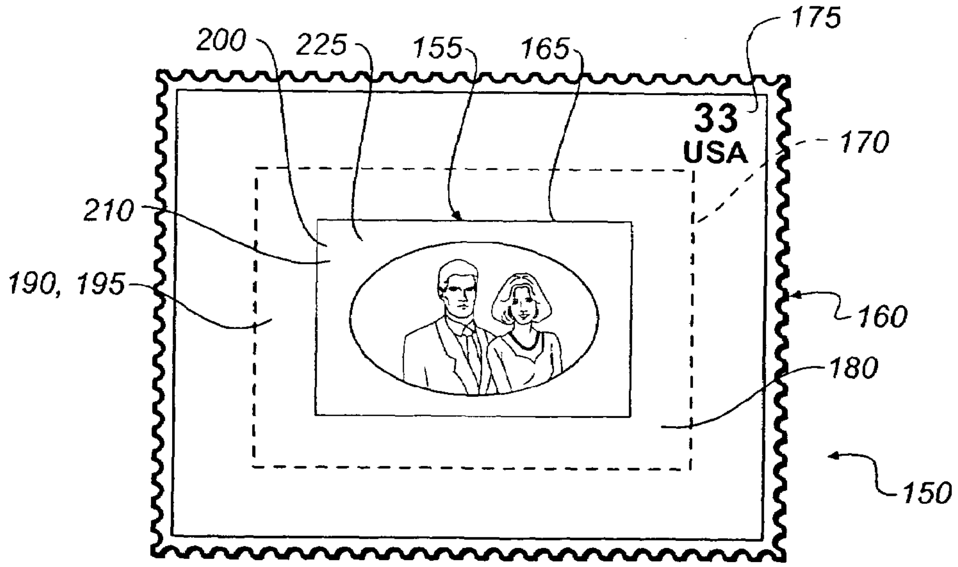
FIG. 5*b* is an enlarged view (in color) of the personal postal product of FIG. 5*a*.

Referring to FIG. 5*b*, there is illustrated an enlarged color view of the personal postal product 150 having the personal image 155 affixed or printed in the designated area 165. Thus the personal image 155 may be provided on a label affixed to the stamp 160 or directly printed on the stamp 160. The printing may occur at the same time or at separate times. The color 190 and/or pattern 195 of the border area 180 of the designated area 165 is matched to one of the colors 200 and pattern 210 present in personal image 155 and in the stamp image area 160. For example the color in surround 225 of the personal image 155 matches the color of the stamp's image 175. The color used to print the border area 180 the designated area 165 may be a complimentary hue or shade of one the colors present in the personal image area 155 and the stamp's image 175. The color and/or pattern for the border area 180 of the designated area 165 can be automatically determined by digitally scanning the personal image 155 and/or stamp 160. Using an algorithm to identify an appropriate color and/or pattern for the border area 180 from the colors and/or pattern present in the personal image area 155 and the stamp's image 175. As previously discussed this is accomplished by determining the colorimetric values of the image pixels of the digital file of the personal image 155 and the stamp image 175 using standard colorimetric techniques.

As discussed above, feathering may occur on the stamp and/or the personal image. In addition the stamp may be placed on the image or the image may be placed on the stamp.

For the purpose of the present invention feathering shall mean any manner of providing a desired transition from a personal image to the stamp by adjusting for example, color, texture, pattern, contrast, subject etc of the personal image and/or stamp for creating an aesthetically pleasing appearance.

The invention has been described in detail with particular reference to certain preferred embodiments thereof, but it will be understood that variations and modifications can be effected within the scope of the invention, the present invention being deferred by the following claims. For example, the stamp color and/or pattern may be matched to the personal image instead of the personal image being modified to the stamp.

PARTS LIST

5 Envelope
10 Personal postal product
15 Personal image
20 Label
25 Official postal image
30 Official postal product (Stamp)
35 Designated area
40 Dashed line
37 Line
45 Border area
46 Sky
48 Sky
50 First planner support structure
55 Top surface
60 Bottom surface
65 Adhesive layer
72 First planner support structure
75 Top surface
80 Bottom surface
90 Outer border lines
85 Adhesive layer
90 Pattern
95 Image
100*a* Imagette
100*b* Imagette
100*c* Imagette
100*d* Imagette
100*e* Imagette
100*f* Imagette
100*g* Imagette
100*h* Imagette
100*i* Imagette
102 Color
105 Pattern
110 Pattern
115 Color
125 Image area
135 Official postal image
140 Dashed line
150 Personal postal product
155 Personal image
160 Stamp
165 Designated area
170 Dashed line
175 Postal image
180 Border area
185 Dashed line
190 Color
195 Pattern
200 Color
210 Pattern
225 Surround

The invention claimed is:

1. A method of making a personal postal product on which a personal image is provided comprising:

obtaining an official postal product having a designated area for placement of an image;

determining at least one colorimetric value of said designated area of said official postal product;

obtaining a personal image;

modifying said personal image in response to said at least one colorimetric value of said official postal product; and providing said modified image in said designated area.

2. A method according to claim 1 wherein the step of determining said at least one calorimetric value is accomplished by digitally scanning said personal image and/or official postal product.

3. A method according to claim 1 wherein said designated area is provided with a border area having said calorimetric value.

4. A method of making a postal product assembly comprising:

obtaining an official postal product;

determining at least one calorimetric value of said official postal product;

obtaining a personal image product having an image thereon, said image having a designated area having at least one image characteristic;

modifying at least one colorimetric value of said personal image in said designated area in response to said at least one know colorimetric value of said official image product.

5. A method according to claim 4 wherein said official postal product comprises a stamp.

6. A method according to claim 4 wherein said official postal product is placed in said designated area.

* * * * *